(12) United States Patent
Jiang et al.

(10) Patent No.: US 11,174,931 B2
(45) Date of Patent: Nov. 16, 2021

(54) DRIVING APPARATUS

(71) Applicants: DAIHEN CORPORATION, Osaka (JP); NIKON CORPORATION, Tokyo (JP)

(72) Inventors: Nan Jiang, Osaka (JP); Hiroshi Nakagiri, Osaka (JP); Kota Hoshijima, Osaka (JP); Kenji Omata, Utsunomiya (JP)

(73) Assignees: Daihen Corporation, Tokyo (JP); Nikon Corporation, Tokyo (JP)

( * ) Notice: Subject to any disclaimer, the term of this patent is extended or adjusted under 35 U.S.C. 154(b) by 188 days.

(21) Appl. No.: 16/110,900

(22) Filed: Aug. 23, 2018

(65) Prior Publication Data
US 2018/0363754 A1 Dec. 20, 2018

Related U.S. Application Data

(63) Continuation of application No. PCT/JP2017/005075, filed on Feb. 13, 2017.

(51) Int. Cl.
*F16H 57/00* (2012.01)
*F16H 57/021* (2012.01)
(Continued)

(52) U.S. Cl.
CPC ............ *F16H 57/021* (2013.01); *B25J 17/00* (2013.01); *F16C 35/06* (2013.01); *F16H 1/28* (2013.01);
(Continued)

(58) Field of Classification Search
CPC .......... B25J 9/102; B25J 17/00; H02K 7/116; H02K 7/003; H02K 11/21; F16H 1/28; F16H 57/021; F16H 57/029
See application file for complete search history.

(56) References Cited

U.S. PATENT DOCUMENTS 6,105,454 A * 8/2000 Bacchi .................... B25J 9/042
414/744.5
2002/0002869 A1 1/2002 Mori et al.
(Continued)

FOREIGN PATENT DOCUMENTS

CN 101931286 A 12/2010
CN 105246656 A 1/2016
(Continued)

OTHER PUBLICATIONS

Extended European Search Report in Europe Application No. 17756274.1, dated Aug. 9, 2019, 9 pages.
(Continued)

*Primary Examiner* — Jake Cook
(74) *Attorney, Agent, or Firm* — Crowell & Moring LLP

(57) ABSTRACT

A driving apparatus has a problem in that a tip end of an output shaft, which is inserted through a hollow space, is difficult to be fitted into the apparatus body during the maintenance. Therefore, a driving apparatus includes an input shaft with a hollow space formed therein that penetrates therethrough in the axial direction, a motor that rotates the input shaft, a reduction gear that receives the power of the motor from the input shaft, an output shaft inserted through the hollow space of the input shaft and adapted to rotate about the rotation axis with power output from the reduction gear, and a coupling connected to a tip end of the output shaft. A first bearing for supporting the output shaft is arranged, and a second bearing for supporting the output shaft is arranged in the hollow space between the input shaft and the output shaft.

9 Claims, 11 Drawing Sheets

(51) Int. Cl.
| | |
|---|---|
| *B25J 17/00* | (2006.01) |
| *F16C 35/06* | (2006.01) |
| *H02K 11/21* | (2016.01) |
| *F16H 1/28* | (2006.01) |
| *F16H 57/029* | (2012.01) |
| *H02K 5/10* | (2006.01) |
| *H02K 7/00* | (2006.01) |
| *H02K 7/08* | (2006.01) |
| *H02K 7/116* | (2006.01) |
| *H02K 15/00* | (2006.01) |

(52) U.S. Cl.
CPC ............ *F16H 57/029* (2013.01); *H02K 5/10* (2013.01); *H02K 7/003* (2013.01); *H02K 7/083* (2013.01); *H02K 7/116* (2013.01); *H02K 11/21* (2016.01); *H02K 15/0006* (2013.01)

(56) References Cited

U.S. PATENT DOCUMENTS

| | | | |
|---|---|---|---|
| 2010/0319478 A1 | 12/2010 | Tominaga | |
| 2015/0053040 A1 | 2/2015 | Ueda et al. | |
| 2016/0072366 A1 | 3/2016 | Omata et al. | |

FOREIGN PATENT DOCUMENTS

| | | |
|---|---|---|
| JP | 2522495 Y2 | 10/1996 |
| JP | 10-257728 A | 9/1998 |
| JP | 2002-096285 A | 4/2002 |
| JP | 2009-121550 A | 6/2009 |
| JP | 2011-024406 A | 2/2011 |
| WO | WO 2014/185489 A1 | 11/2014 |

OTHER PUBLICATIONS

Written Opinion English Translation from Application PCT/JP2017/005075, dated May 9, 2017, 9 pages.

International Search Report, with English Translation, from Application PCT/JP2017/005075, dated May 9, 2017, 6 pages.

Office Action in China Application No. 201780011696.X, dated Nov. 4, 2020, 2 pages.

* cited by examiner

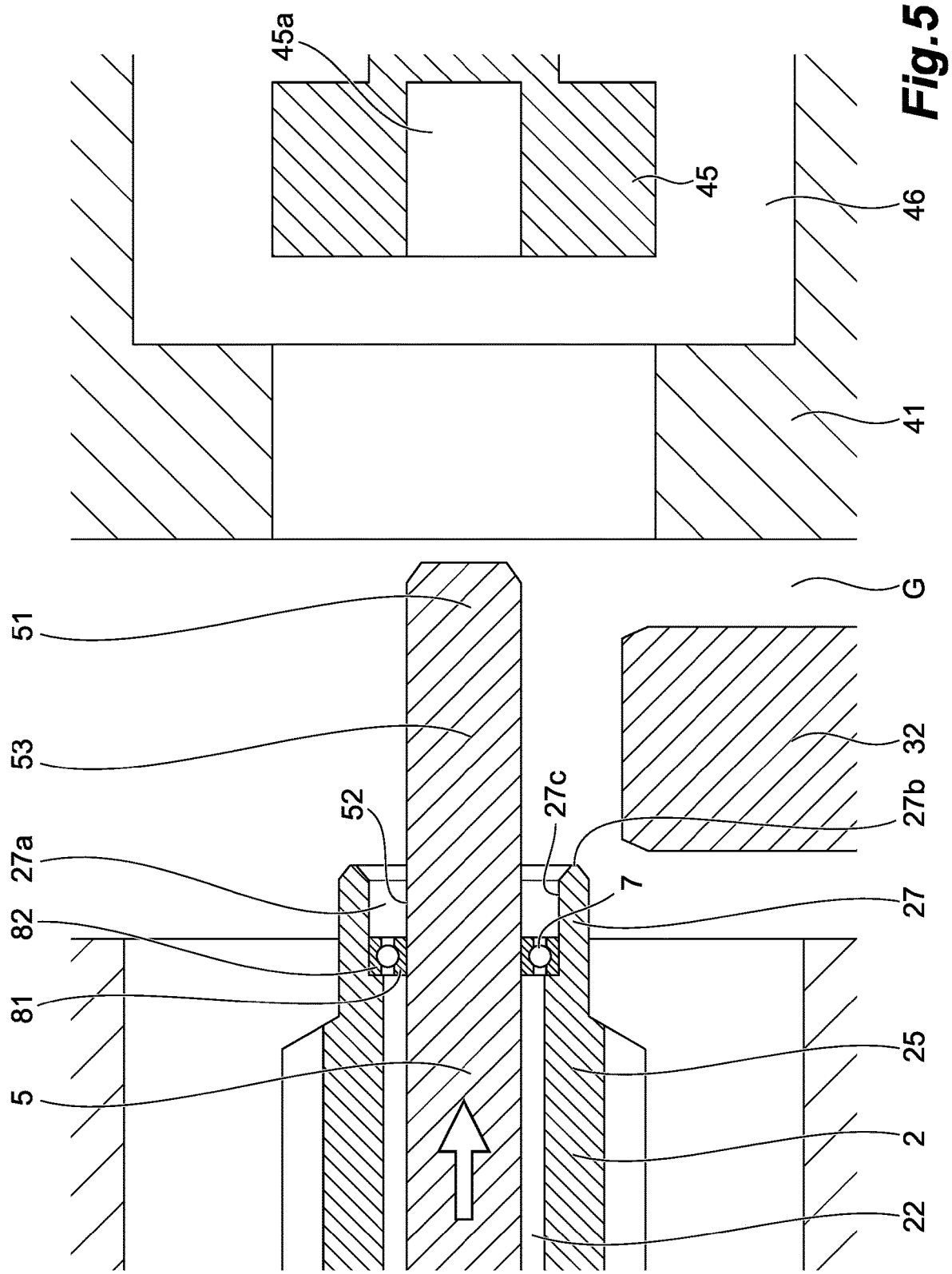

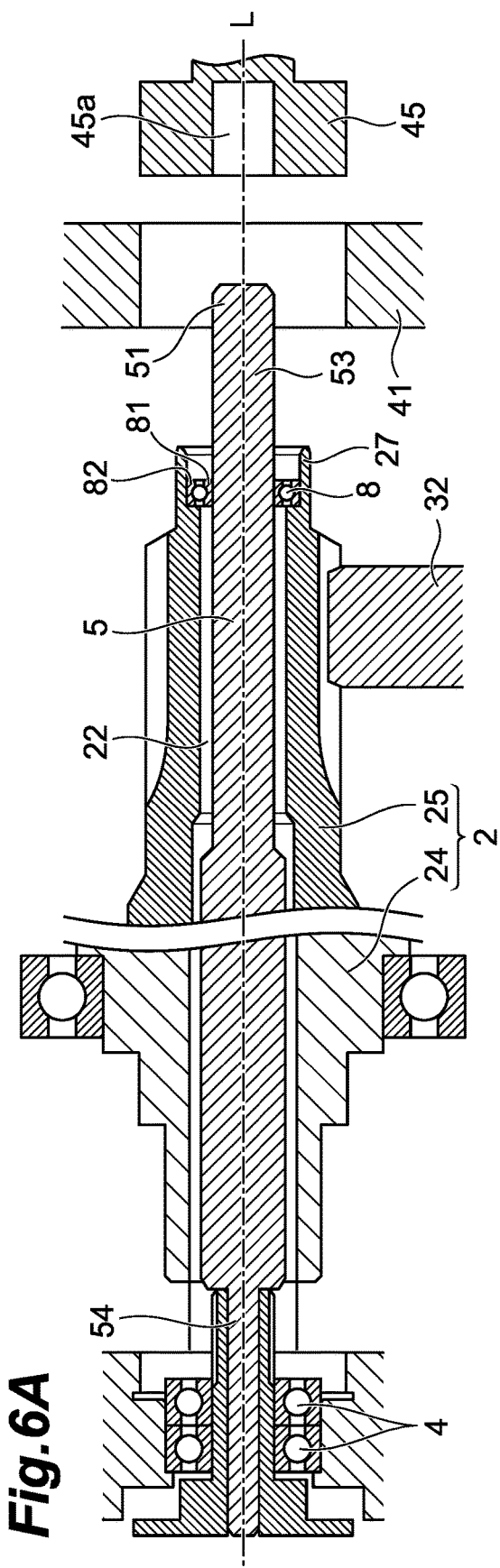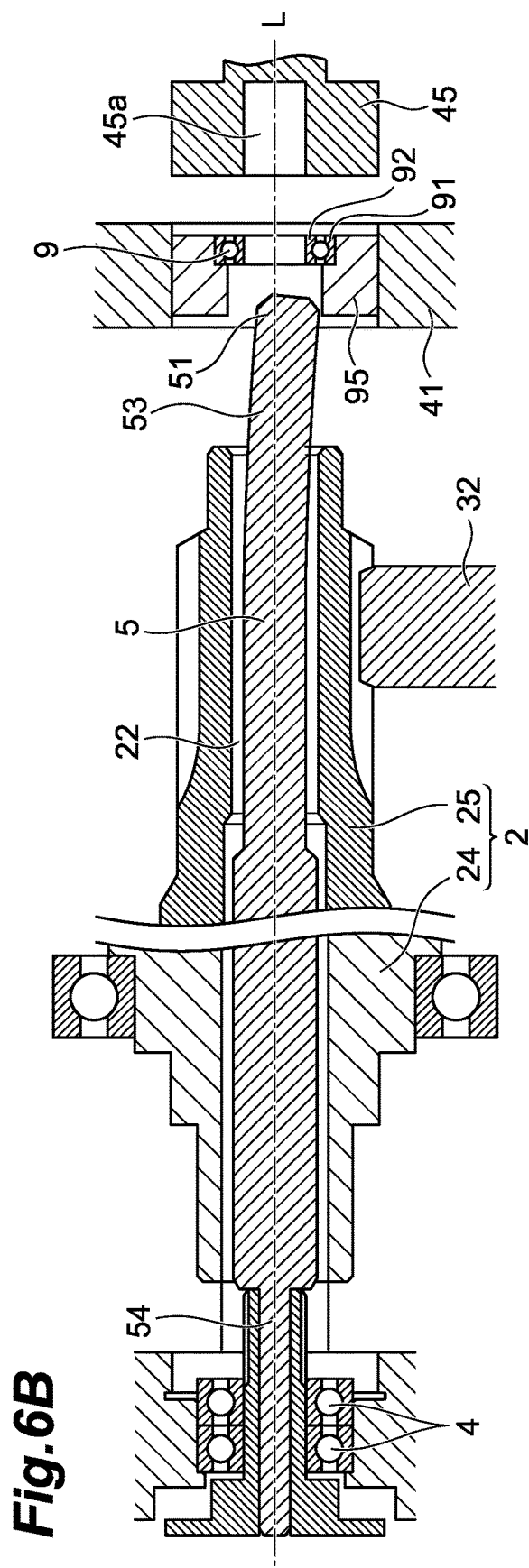

DRIVING APPARATUS

RELATED APPLICATIONS

This is a Continuation of PCT International Application PCT/JP2017/005075 filed on Feb. 13, 2017, which in turn claims benefit of Japanese Patent application JP 2016-033810 filed on Feb. 25, 2016, the entire contents of each of which incorporated herein by reference.

BACKGROUND OF THE INVENTION

1. Field of the Invention

The present invention relates to a driving apparatus that is suitably used for industrial robots, for example.

2. Description of the Related Art

Conventionally, driving apparatuses have been used to drive industrial robots. For example, Patent Literature 1 proposes a driving apparatus including an input shaft that rotates with the power of a motor, a reduction gear that receives the power of the motor from the input shaft, and an output shaft that rotates with the power output from the reduction gear.

The input shaft of the driving apparatus has a hollow space formed therein that penetrates through the input shaft in the axial direction, and the output shaft is inserted through the hollow space. The reduction gear is arranged on one side of the motor, and a detector, which detects information on the rotation of the input shaft and the output shaft, is arranged on the other side of the motor.

CITATION LIST

Patent Literature

Patent Literature 1: JP 2522495 Y2

SUMMARY OF THE INVENTION

When maintenance is carried out on this type of driving apparatus, it is often the case that the input shaft and the output shaft are integrally detached from the apparatus body such as the reduction gear, and thereafter, the input shaft and the output shaft are fitted into the apparatus body again. However, since most driving apparatuses have a structure in which the output shaft is supported only on its single side on the other side of the motor, it would be not easy to fit a tip end of the output shaft, which is inserted through the hollow space, into the apparatus body.

According to the first aspect of the present invention, there is provided a driving apparatus including an input shaft with a hollow space formed therein, the hollow space penetrating through the input shaft in the axial direction; a motor configured to rotate the input shaft about the rotation axis along the axial direction; a reduction gear arranged on one side of the motor, the reduction gear being configured to receive the power of the motor from the input shaft; an output shaft inserted through the hollow space of the input shaft, the output shaft being adapted to rotate about the rotation axis with the power output from the reduction gear; a coupling connected to a tip end of the output shaft on the one side of the motor so as to transmit the power output from the reduction gear to the output shaft; and a detector provided on the other side of the motor, the detector being configured to detect information on the rotation of the input shaft and information on the rotation of the output shaft, in which a first bearing adapted to support the output shaft is arranged on the other side of the motor, and a second bearing adapted to support the output shaft is arranged on the one side of the motor, in the hollow space between the input shaft and the output shaft.

According to the second aspect of the present invention, there is provided a driving apparatus including an input shaft with a hollow space; a motor configured to rotate the input shaft; an output shaft inserted through the hollow space of the input shaft, the output shaft being adapted to rotate about the rotation axis of the motor; a transmitter configured to transmit the rotation of the input shaft to the output shaft; and a detector configured to detect information on the rotation of the input shaft and information on the rotation of the output shaft, in which the output shaft has a protrusion on its transmitter side as one side of the output shaft, the protrusion protruding beyond the hollow space, and the output shaft has on its detector side a first supporting member adapted to support the output shaft, and has on its transmitter side a second supporting member arranged on or around the protrusion, the second supporting member being adapted to support the output shaft.

According to the third aspect of the present invention, there is provided a driving apparatus including an input shaft with a hollow space formed therein; a motor configured to rotate the input shaft; a reduction gear arranged on one side of the input shaft, the reduction gear being configured to receive the power of the motor from the input shaft; an output shaft inserted through the hollow space of the input shaft, the output shaft being adapted to rotate with the power output from the reduction gear; a first bearing arranged on the other side of the input shaft, the first bearing being adapted to support the output shaft; and a second bearing arranged on the one side of the input shaft in the hollow space, the second hearing being adapted to support the output shaft.

BRIEF DESCRIPTION OF THE DRAWINGS

FIG. 5 is an enlarged view of the primary portion illustrating the operation of assembling the driving apparatus from the state illustrated in FIG. 4.

FIG. 6A is a schematic view illustrating the assembly operation illustrated in FIG. 5.

FIG. 6B is a schematic view for illustrating a comparative example of the driving apparatus illustrated in FIG. 6A.

DETAILED DESCRIPTION OF THE PREFERRED EMBODIMENTS

Hereinafter, several embodiments for carrying out the present invention will be described with reference to FIGS. 1 to 11. It should be noted that the scope of the present invention is not limited to the following embodiments, and can be changed as appropriate within the spirit and scope of the present invention.

First Embodiment

1. Regarding the Structure Of A Driving Apparatus 100

Figure 1:
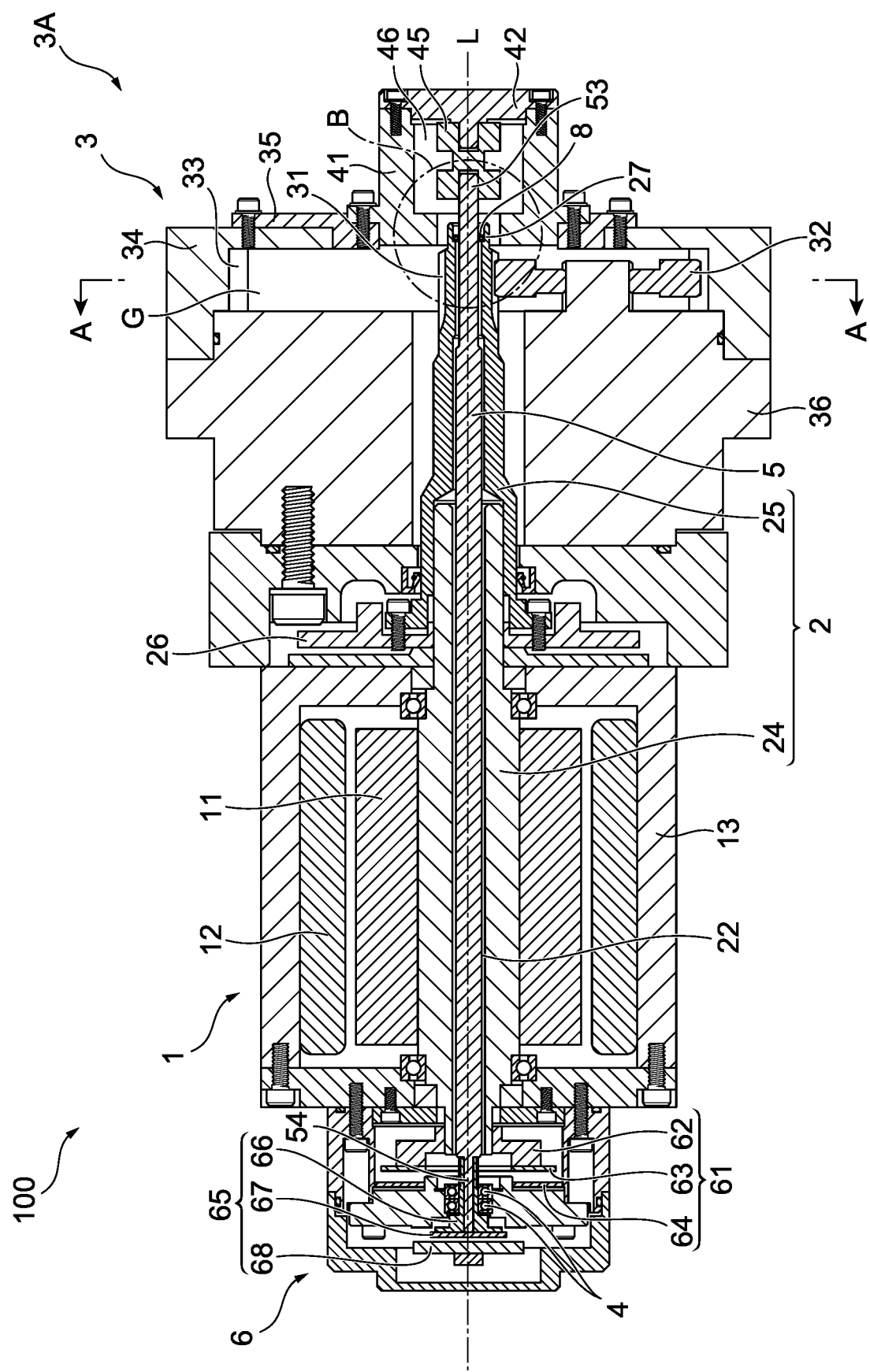
FIG. 1 is a schematic cross-sectional view illustrating the entire configuration of a driving apparatus in accordance with the first embodiment.
Figure 2:
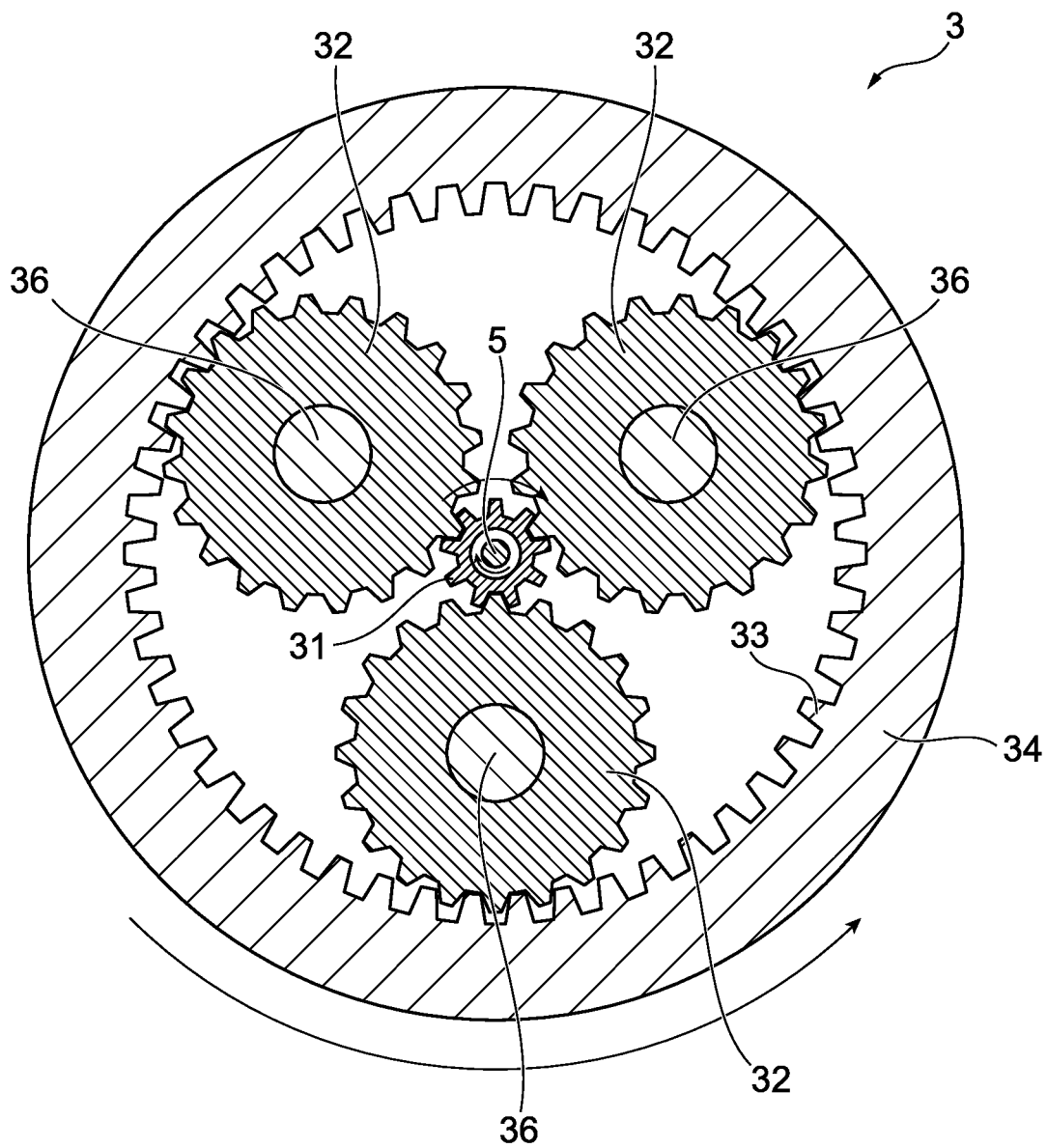
FIG. 2 is a cross-sectional view taken along line A-A of FIG. 1.
Figure 3:
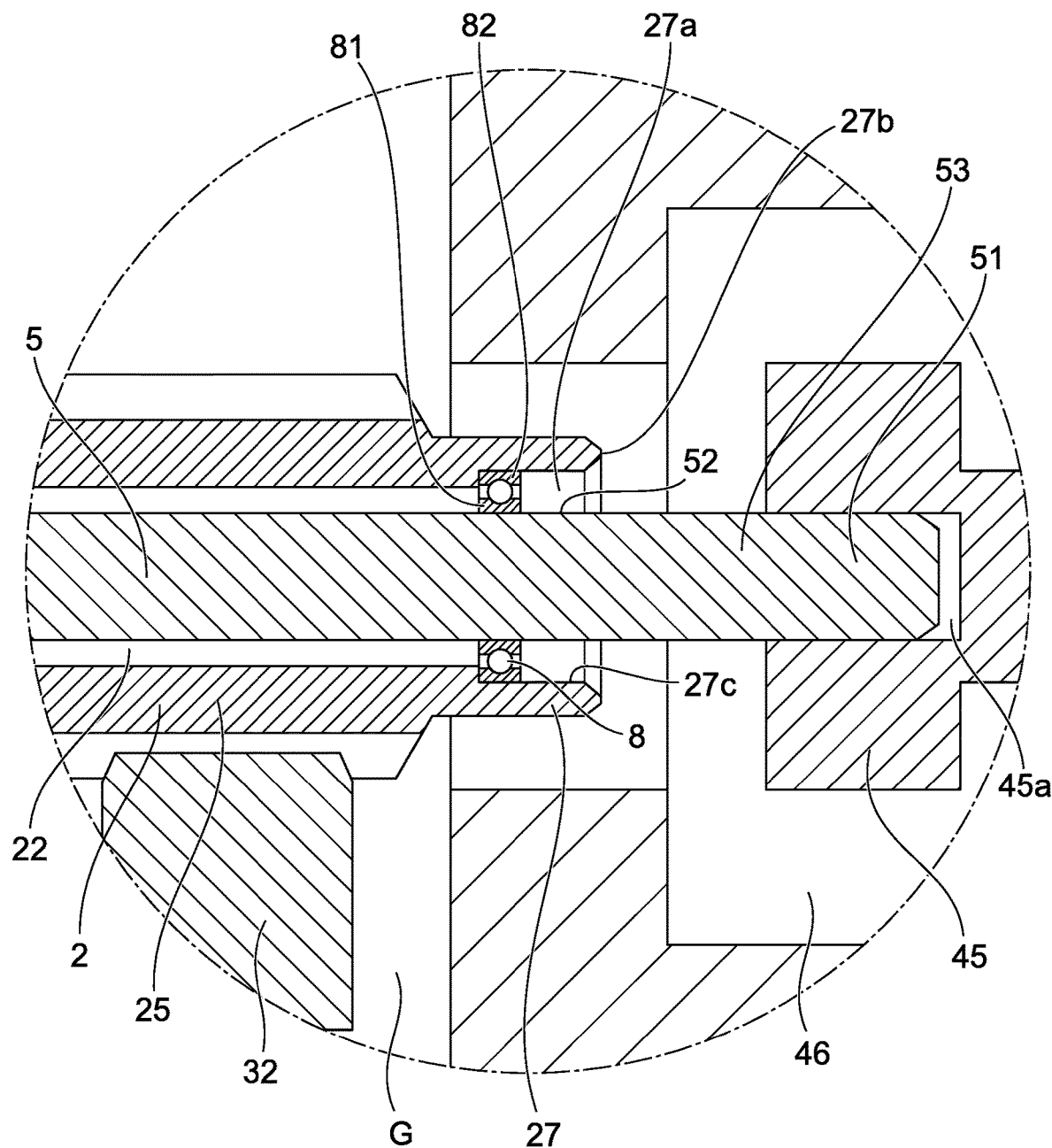
FIG. 3 is an enlarged cross-sectional view of a region around a portion B illustrated in FIG. 1.

FIG. 1 is a schematic cross-sectional view illustrating the entire configuration of a driving apparatus 100 in accordance with the first embodiment. FIG. 2 is a cross-sectional view taken along line A-A of FIG. 1. FIG. 3 is an enlarged cross-sectional view of a region around a portion B illustrated in FIG. 1.

As illustrated in FIG. 1, the driving apparatus 100 in accordance with this embodiment is an apparatus that is used for a robot, for example, and that has a configuration in which power from a motor 1 is input to a transmitter 3A including a reduction gear 3, for example, via an input shaft 2, and an output shaft 5 is rotationally driven via the transmitter 3A. The driving apparatus 100 includes at least the motor 1, the input shaft 2, the transmitter 3A, and the output shaft 5, and further includes a detector 6 as a more preferable configuration.

The motor 1 is a servomotor of a synchronous motor that includes at least a rotor 11 having a permanent magnet arranged thereon, a stator 12 having a coil arranged thereon, and a casing 13 housing them. In this embodiment, although an electric motor is used for the motor 1, an air motor that uses air as power, a hydraulic motor that uses hydraulic pressure as power, or the like can also be used.

The rotor 11 of the motor 1 has a first shaft 24 coupled thereto. A tip end of the first shaft 24, located on one side of the motor 1, has a second shaft 25 integrally attached thereto via an attachment 26. In this embodiment, the first shaft 24 and the second shaft 25 form the input shaft 2 that inputs the power of the motor 1 to the reduction gear 3 of the transmitter 3A.

The input shaft 2 is substantially cylindrical in shape, and rotates about the rotation axis L as the motor 1 is rotationally driven. The input shaft 2 has a hollow space 22 formed therein that penetrates through the input shaft 2 in the axial direction (the direction of the axis), and the output shaft 5 is inserted through the hollow space 22. It should be noted that the axial direction is the direction that serves as the central line of a rotational motion when the input shaft 2 rotates, and that coincides with the rotation axis L. The input shaft 2 through which the output shaft 5 is inserted is arranged such that the input shaft 2 penetrates through the opposite sides of the motor 1.

The transmitter 3A, which transmits the rotation of the input shaft 2 to the output shaft 5, is arranged on one side of the motor 1, that is, one side of the input shaft 2. One side of the motor 1 may be rephrased as the transmitter 3A side of the motor 1. The transmitter 3A, may include the reduction gear 3. The reduction gear 3 receives the power of the motor 1 from the input shaft 2. Although a planetary gear mechanism is used for the reduction gear 3 in this embodiment, a harmonic gear mechanism or a mechanical reduction gear may also be used, for example.

As illustrated in FIG. 2, the planetary gear mechanism in accordance with this embodiment includes a sun gear 31 that rotates about the rotation axis L, three planet gears 32 that rotate while meshing with the sun gear 31, and an internal gear 33 that rotates while meshing with the three planet gears 32. The sun gear 31 is formed on the input shaft 2 (specifically, the second shaft 25), and the internal gear 33 is formed on a cover 34 of the reduction gear 3. Each of the three planet gears 32 is coupled to a planet carrier 36 so as to be rotatable.

With the aforementioned configuration, the power of the motor 1 transmitted from the input shaft 2 is transmitted to the reduction gear 3, and with the transmitted power, the cover 34, which has the internal gear 33 formed thereon, rotates about the rotation axis L. The inside of the reduction gear 3 is filled with grease G, and the input shaft 2 is connected to the reduction gear 3 as a tip end 27 of the input shaft 2 is inserted into the reduction gear 3. When the input shaft 2 is connected to the reduction gear 3, the input shaft 2 is supported by the planet gears 32 of the reduction gear 3. Although the sun gear 31 is formed on the input shaft 2 in this embodiment, the sun gear 31 and the input shaft 2 may be formed as separate members and coupled together.

The planet carriers 36 and the cover 34 that partially form the reduction gear 3 can be selectively fixed. When the planet carriers 36 and the cover 34 are not fixed, the planet gears 32 and the internal gear 33 can independently revolve about the sun gear 31. Meanwhile, when the planet carriers 36 and the cover 34 are fixed, the planet gears 32 and the internal gear 33 can integrally revolve about the sun gear 31. In this manner, the reduction gear ratio of the reduction gear 3 can be changed.

The cover 34 of the reduction gear 3 is coupled to one side of a coupling 45 via a plate-like first power transmission member 35, a cylindrical second power transmission member 41, and a third power transmission member 42. Accordingly, the rotation of the cover 34 of the reduction gear 3 can be transmitted to the output shaft 5, it should be noted that one of the first, second, and third power transmission members 35, 41, and 42, for example, may partially form a robot body (not illustrated), or one of them may be connected to the robot body. Consequently, the robot can be operated as the cover 34 rotates.

A joint housing chamber 46 for housing the coupling 45 is formed in an internal space that is formed by the second power transmission member 41 and the third power transmission member 42. The coupling 45 arranged in the joint housing chamber 46 couples the third power transmission member 42 to the output shaft 5. With such a configuration, the coupling 45 transmits power output from the reduction gear 3 to the output shaft 5. With the power output from the reduction gear 3, the output shaft 5 can rotate about the rotation axis L. In addition, since a tip end 51 of the output shaft 5 is coupled to the coupling 45, eccentricity of the output shaft 5 with respect to the rotation axis L can be adjusted. Although the transmitter 3A includes the reduction gear 3, the first, second, and third power transmission members 35, 41, 42, and the coupling 45, for example, it is preferable that the transmitter 3A include at least the reduction gear 3 and the coupling 45, and the configuration of the transmitter 3A is not particularly limited as long as the rotation of the input shaft 2 can be transmitted to the output shaft 5.

The output shaft 5 is an elongated cylindrical member, and is inserted through the hollow space 22 of the input shaft 2 without contacting the input shaft 2, so as to rotate with the power output from the reduction gear 3. The output shaft 5 is longer than the input shaft 2, and an end of the output shaft 5 protrudes beyond an end of the input shaft 2. The opposite ends of the output shaft 5 may protrude beyond the opposite ends of the input shaft 2. If the output shaft 5 protrudes on one side of the motor 1, as illustrated in FIG. 3, one side of the output shaft 5 has formed thereon a first protrusion 53 that protrudes beyond the hollow space 22 of the input shaft 2, and the tip end 51 of the first protrusion 53 has the coupling 45 connected thereto. It should be noted that as illustrated in FIG. 3, the first protrusion 53 may further protrude beyond the reduction gear 3. The other side of the output shaft 5, which is the other side of the motor 1, also has formed thereon a second protrusion 54 that protrudes beyond the hollow space 22 of the input shaft 2 toward the detector 6 side. At this portion, the output shaft 5 is supported by a first supporting member (first bearing) 4, such as a hearing. In other words, in this embodiment, the first supporting member (first bearing) 4 is arranged on the other side of the input shaft 2, and supports the output shaft 5.

More preferably, the detector 6, which detects rotation information (information on the rotation) of the input shaft and the output shaft, is arranged on the other side of the motor 1, that is, the other side of the input shaft 2. The other side of the motor 1 may be rephrased as the detector side of the motor 1. The detector 6 includes a first detector 61 and a second detector 65. The first detector 61 detects information on the rotation (for example, the direction of the rotation, the angular position, and the number of revolutions) of the input shaft 2. The first detector 61 includes a rotating hub 62, a scale 63, and a sensor (rotation detector) 64. The rotating hub 62 is fixed on an end of the input shaft 2, and the disk-like scale 63 is fixed on the rotating hub 62. Accordingly, the input shaft 2, the rotating hub 62, and the scale 63 are integrally rotatable.

The rotation detector 64 is fixed at a position opposite the scale 63. The rotation detector 64 is a photodetector or a magnetic detector, for example. For example, when the rotation detector 64 is a photodetector, the surface of the scale 63 is irradiated with a detection beam, and the detection beam reflected by an index pattern formed on the surface is received by light-receiving elements, such as photodiodes, for example. The rotation detector 64 can detect information on the rotation of the input shaft 2.

The second detector 65 detects information on the rotation (for example, the direction of the rotation, the angular position, and the number of revolutions) of the output shaft 5. The second detector 65 includes a rotating hub 66, a scale 67, and a sensor (rotation detector) 68. The second detector 65 can detect information on the rotation of the output shaft 5 on the basis of the same principle as the first detector 61. It should be noted that the principle of detecting, with the first detector 61, information on the rotation of the input shaft 2 may differ from the principle of detecting, with the second detector 65, information on the rotation of the output shaft 5.

Further, in this embodiment, as illustrated in FIG. 3, a second supporting member (second bearing) 8, such as a bearing, for supporting the output shaft 5 is arranged on one side of the motor 1 in the hollow space 22 between the input shaft 2 and the output shaft 5. The second bearing 8 is arranged closer to one side of the motor 1 than to the reduction gear 3. In other words, in this embodiment, the second supporting member (second bearing) 8 is arranged on one side of the input shaft 2 and supports the output shaft 5. The second bearing 8 is arranged around the tip end 51 in the hollow space 22, but may also be arranged around the first protrusion 53.

The tip end 27 of the input shaft 2 has a housing recess 27a formed therein, and the second bearing 8 is housed in the housing recess 27a. An inner lace 81 of the second bearing 8 is arranged around the outer periphery 52 of the output shaft 5. Meanwhile, an outer lace 82 of the second bearing 8 is arranged around the inner periphery 27c of the housing recess 27a of the input shaft 2. In this manner, the output shaft 5 is rotatably supported on the input shaft 2 via the second bearing 8. In this embodiment, as described below, the output shaft 5 can be attached to and detached from the coupling 45 while being integrally coupled to the input shaft 2.

Further, interference is provided between one of a pair of the inner lace 81 and the outer periphery 52 or a pair of the outer lace 82 and the inner periphery 27c, and the other of the pairs is movable with respect to each other in the axial direction. Accordingly, even when the second bearing 8 is fixed on one of the input shaft 2 or the output shaft 5, and the output shaft 5 extends in the axial direction due to thermal expansion, the interference may be absorbed without the extension of the output shaft 5 restrained.

2. Regarding the Operation of the Driving Apparatus 100

Hereinafter, the operation of the driving apparatus 100 in this embodiment will be described.

First, when the motor 1 is driven, the input shaft 2 rotates about the rotation axis L. With the rotation of the input shaft 2, the power of the motor 1 is input to the reduction gear 3 from the input shaft 2. With the power input to the reduction gear 3, the cover 34 of the reduction gear 3 rotates the number of times corresponding to the reduction gear ratio. With the rotation of the cover 34, the output shaft 5, which is coupled to the cover 34 via the first, second, and third power transmission members 35, 41, and 42 and the coupling 45, rotates the same number of times as the cover 34.

In the first detector 61, the rotating hub 62 and the scale 63 rotate with the rotation of the input shaft 2, and the rotation detector 64 detects information on the rotation of the input shaft 2. Meanwhile, in the second detector 65, the rotating hub 66 and the scale 67 rotate with the rotation of the output shaft 5, and the rotation detector 68 detects information on the rotation of the output shaft 5.

Herein, on one side and the other side of the motor 1, the output shaft 5 is supported on its opposite sides by the first bearing 4 and the second bearing 8. Therefore, the output shaft 5 is rotatably supported on its opposite sides. Accordingly, whirling of the output shaft 5 can be suppressed during operation of the driving apparatus, and thus the accuracy of detection of information on the rotation of the output shaft 5 by the detector 6 can be enhanced.

3. Regarding the Maintenance Operation for the Driving Apparatus 100

Hereinafter, the maintenance operation for the driving apparatus 100 this embodiment will be described.

Figure 4:
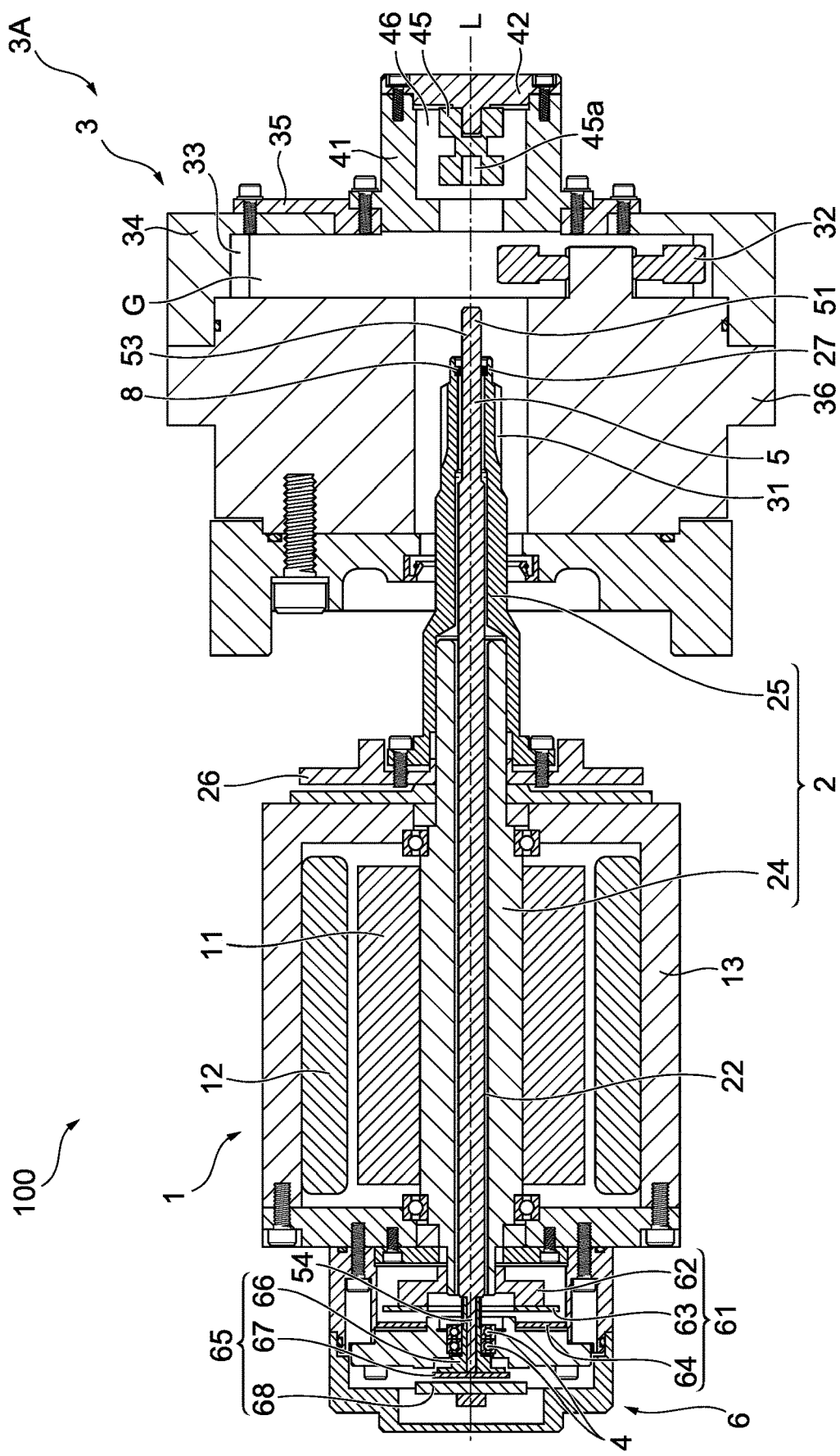
FIG. 4 is a view illustrating the state of the driving apparatus illustrated in FIG. 1 during the maintenance operation.

FIG. 4 is a view illustrating the state of the driving apparatus 100 illustrated in FIG. 1 during the maintenance operation. FIG. 5 is an enlarged view of the primary portion illustrating the operation of assembling the driving apparatus 100 from the state illustrated in FIG. 4. FIG. 6A is a schematic view illustrating the assembly operation illustrated in FIG. 5. FIG. 6B is a schematic view for illustrating a comparative example of FIG. 6A.

For example, in order to replace the parts of the detector 6 during the maintenance operation, as illustrated in FIG. 4, the parts of the transmitter 3A, such as the reduction gear 3, are left on the robot body side, while the motor 1, the input shaft 2, the output shaft 5, and the detector 6 are integrally pulled out as a single unit. The output shaft 5 is detached from the coupling 45 while being integrally coupled to the input shaft 2.

After the replacement of the parts, in order to return the unit, which has been pulled out once, to the initial state again, the input shaft 2 is connected again to the reduction gear 3, and the tip end 51 of the protrusion 53 of the output shaft 5, which is integrally coupled to the input shaft 2 and inserted through the hollow space 22, is inserted into a coupling hole 45a of the coupling 45 (see FIG. 5).

Herein, as illustrated in the comparative example in FIG. 6B, if the output shaft 5 inserted through the hollow space 22 is supported only on its single side by the first bearing 4 on the detector 6 side, the position of the tip end 51 of the output shaft 5 is unstable. Further, the output shaft 5 can easily warp due to its own weight since it is thinner and longer than the input shaft 2.

Based on such a premise, if a bearing 9 is fixed on the apparatus body side, such as the second power transmission member 41 side, for example, in order to support the output shaft 5 on its opposite sides during operation of the driving apparatus, it would be not easy to guide the tip end 51 of the output shaft 5 into the bearing 9 and align the output shaft 5 with the coupling 45 so as to fit the output shaft 5 into the apparatus body.

However, in this embodiment, the output shaft 5 is rotatably supported on its opposite sides by the first bearing 4 and the second bearing 8, as illustrated in FIG. 6A. Accordingly, the position of the tip end 51 of the first protrusion 53 of the output shaft 5 can be stabilized, and thus the tip end 51 can be easily guided into the coupling hole 45a of the coupling 45. Consequently, the fitting property of the output shaft 5 with respect to the apparatus body can be enhanced.

In particular, in this embodiment, since the second bearing 8 is arranged around the tip end 27 of the input shaft 2, the output shaft 5 can be rotatably supported by the second bearing 8 on a side closer to the tip end 51 of the output shaft 5. Accordingly, the warp of the output shaft 5 due to its own weight can be reduced, and the output shaft 5 can be easily aligned with the coupling hole 45a of the coupling 45.

Second Embodiment

Figure 7:
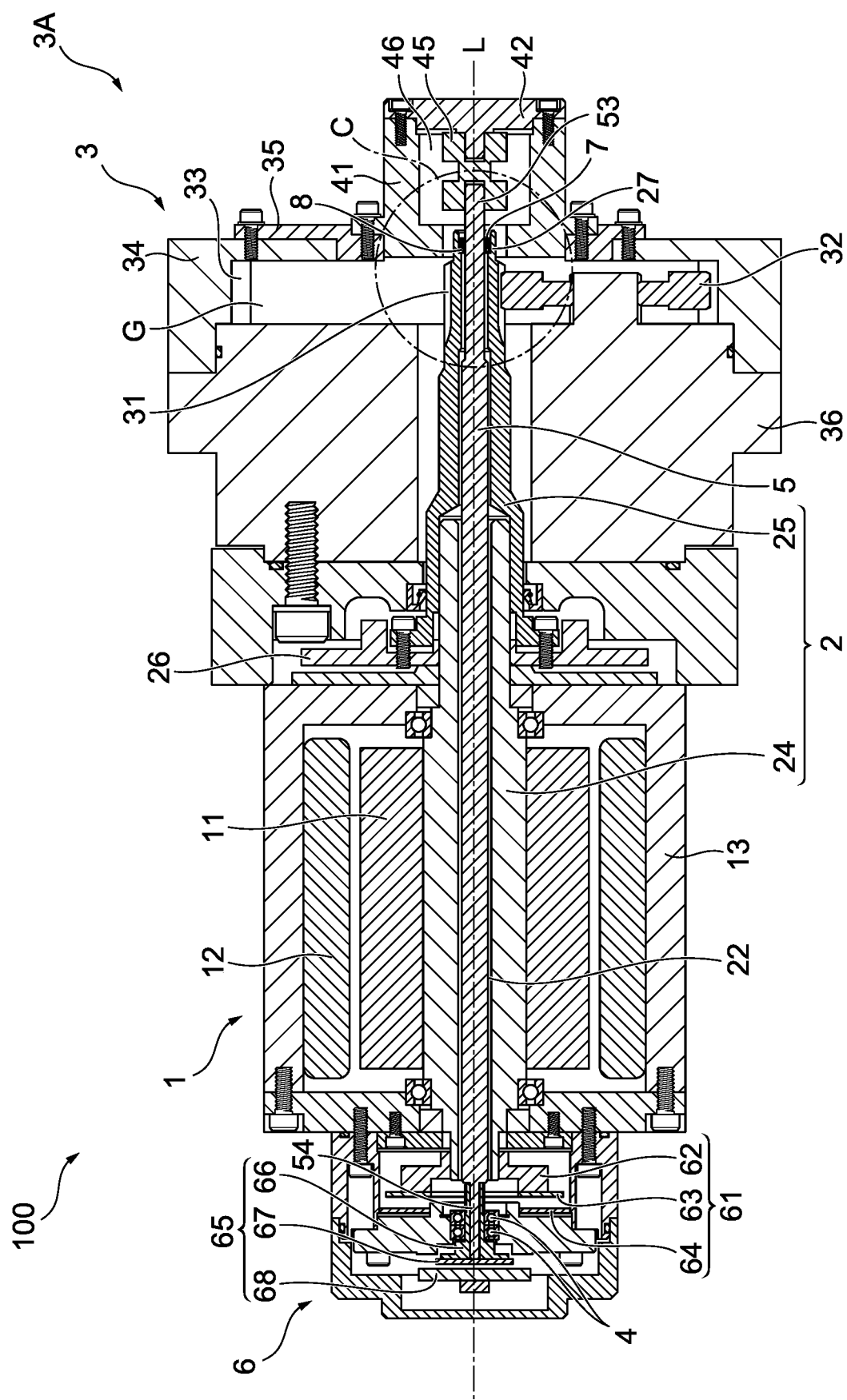
FIG. 7 is a schematic cross-sectional view illustrating the entire configuration of a driving apparatus in accordance with the second embodiment.
Figure 8:
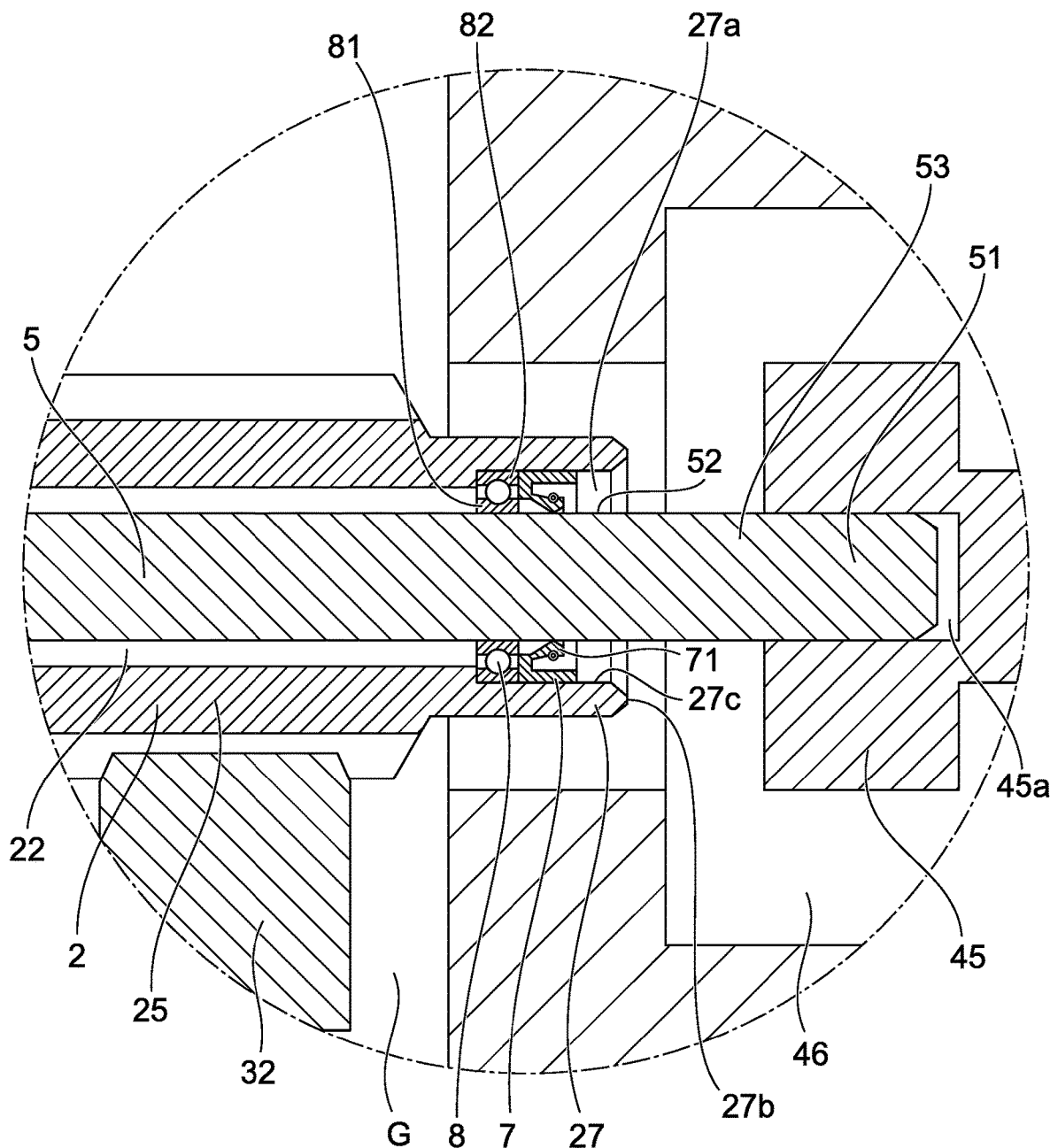
FIG. 8 is an enlarged view of a region around a portion C illustrated in FIG. 7.
Figure 9:
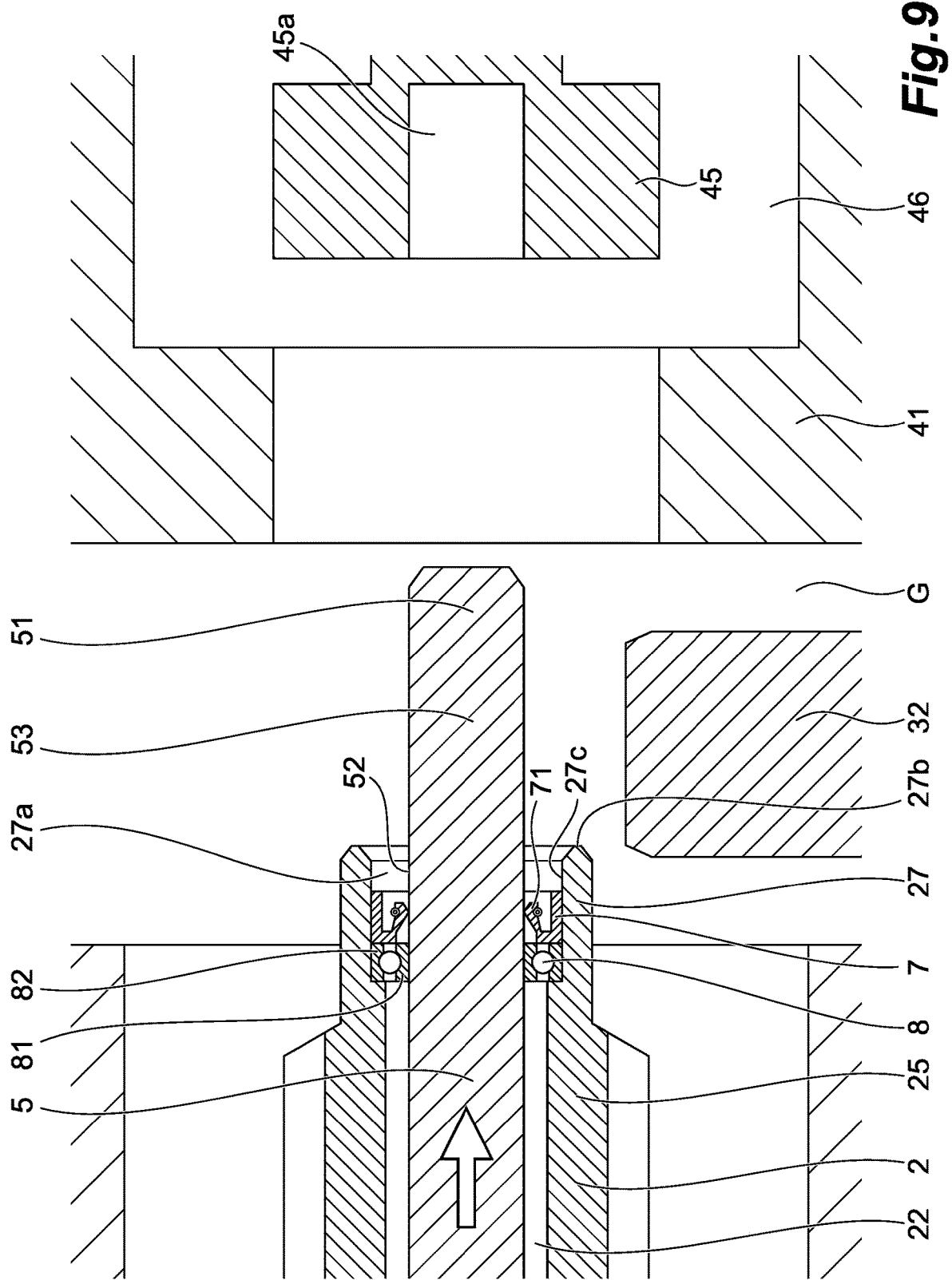
FIG. 9 is an enlarged view of the primary portion illustrating the state of the driving apparatus illustrated in FIG. 7 during the maintenance operation.

FIG. 7 is a schematic cross-sectional view illustrating the entire configuration of the driving apparatus 100 in accordance with the second embodiment. FIG. 8 is an enlarged view of a region around a portion C illustrated in FIG. 7, FIG. 9 is an enlarged view of the primary portion illustrating the state of the driving apparatus illustrated in FIG. 7 during the maintenance operation.

The driving apparatus 100 in the second embodiment differs from that in the first embodiment in that an oil seal (seal member) 7 is further provided on the tip end 27 of the input shaft 2. Therefore, in this embodiment, elements that are the same as or equivalent to those in the first embodiment are denoted by the same reference numerals, and the description thereof will be omitted or simplified.

As illustrated in FIG. 7, in the driving apparatus 100 in accordance with the second embodiment, the oil seal 7 is attached adjacent to the second bearing 8 of the tip end 27 of the input shaft 2. Specifically, as illustrated in FIG. 8, the oil seal 7 is arranged closer to the tip end 27b side of the input shaft 2 than is the second bearing 8, in the hollow space 22 between the input shaft 2 and the output shaft 5.

The oil seal 7 is attached in an orientation such that it can suppress the intrusion (movement) of foreign matter, such as grease G, into the hollow space 22. An annular lip 71 of the oil seal 7 is tightly attached to the outer periphery 52 of the output shaft 5 at a position where the lip 71 separates the hollow space 22 from its outside.

Providing the oil seal 7 can suppress the intrusion of the grease G into the hollow space 22 of the input shaft 2 when the driving apparatus 100 is driven. In particular, since the oil seal 7 is attached adjacent to the second bearing 8, there is no possibility that the oil seal 7 will deform excessively. Accordingly, the sealing property of the oil seal 7 can be ensured.

Further, during the maintenance operation for the driving apparatus 100, the input shaft 2, which has the output shaft 5 inserted through its hollow space 22, is detached from the reduction gear 3, and is attached again to the reduction gear 3, as described above.

Herein, the input shaft 2 and the output shaft 5 may be further pulled out integrally from the state illustrated in FIG. 8 so that the oil seal 7 is replaced if it has deteriorated or worn. In such a case, as is clear from FIG. 9, only the oil seal 7 may be replaced from the tip end 27b side of the input shaft 2 without the need to detach the second bearing 8.

Accordingly, there is no possibility that the accuracy of fitting (tolerance) of the second bearing 8 with respect to the input shaft 2 and the output shaft 5 will change due to the detachment or re-attachment of the second bearing 8. Consequently, since the positional relationship between the output shaft 5 and the coupling 45 is maintained, the output shaft 5 that has been pulled out once from the coupling 45 can be easily coupled to the coupling 45 again.

Further, when the input shaft 2 is attached again to the apparatus body such as reduction gear 3, a decrease in the rotation accuracy of the input shaft 2 and the output shaft 5 due to the intrusion of the grease G into the hollow space can be suppressed since the oil seal 7 is always arranged in the hollow space 22.

Third Embodiment

Figure 10:
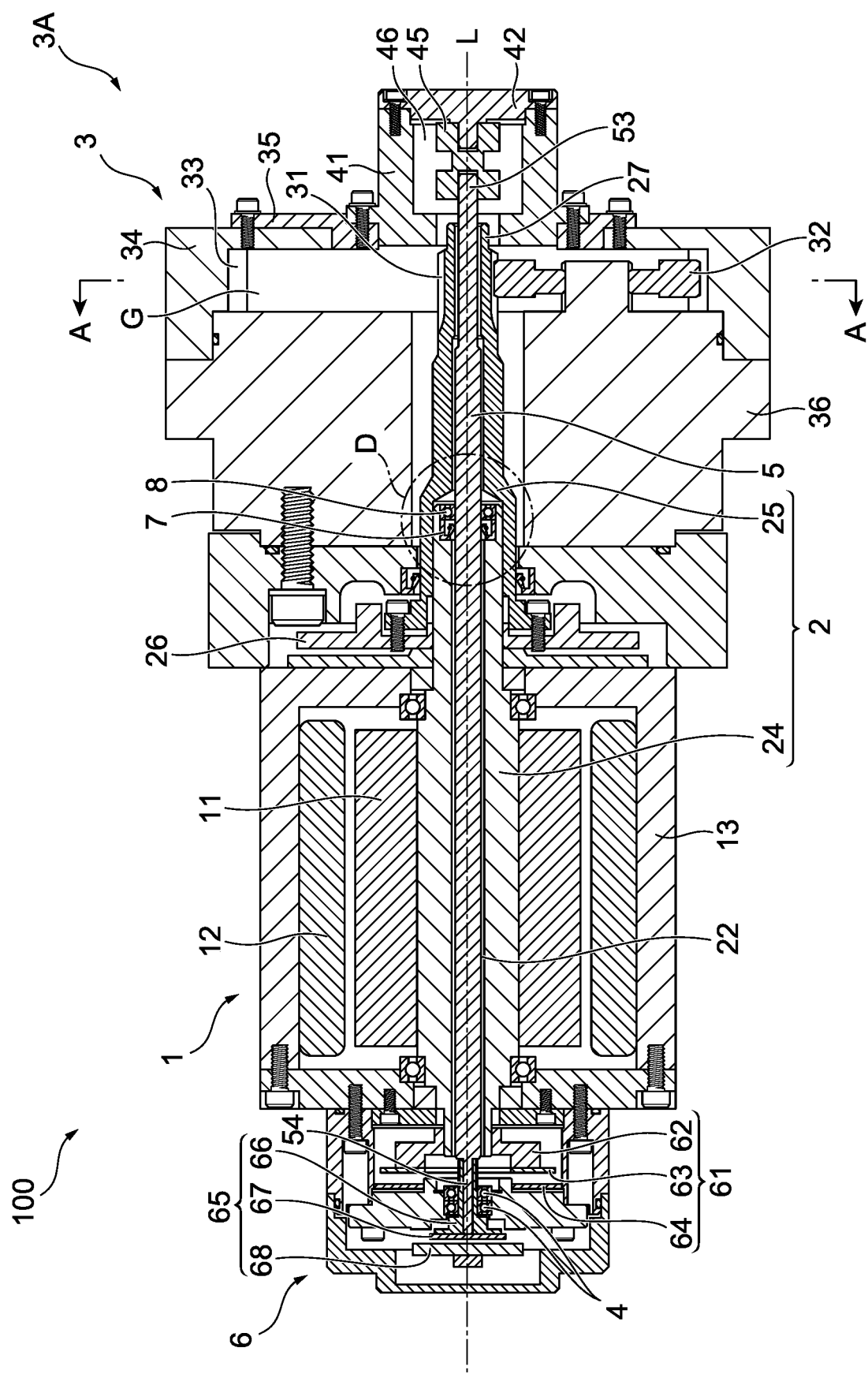
FIG. 10 is a schematic cross-sectional view illustrating the entire configuration of a driving apparatus in accordance with the third embodiment.
Figure 11:
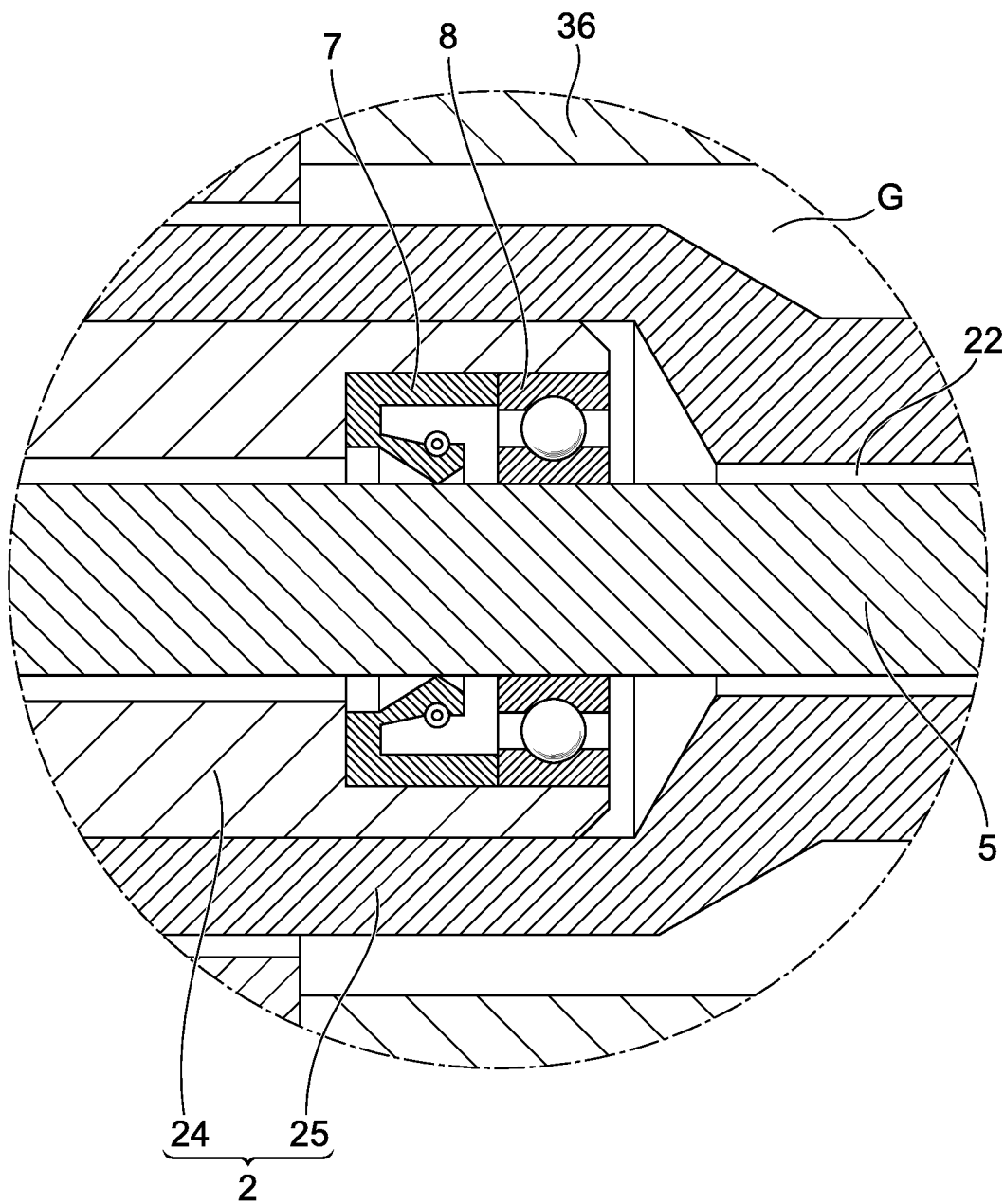
FIG. 11 is an enlarged view of a region around a portion D illustrated in FIG. 10.

FIG. 10 is a schematic cross-sectional view illustrating the entire configuration of the driving apparatus 100 in accordance with the third embodiment. FIG. 11 is an enlarged view of a region around a portion D illustrated in FIG. 10.

The driving apparatus 100 in the third embodiment differs from that in the second embodiment in the positions where the oil seal 7 and the second bearing 8 are arranged. Therefore, in this embodiment, elements that are the same as or equivalent to those in the second embodiment are denoted by the same reference numerals, and the description thereof will be omitted or simplified.

As illustrated in FIGS. 10 and 11, in the driving apparatus 100 in accordance with the third embodiment, the oil seal 7 and the second bearing 8 are arranged adjacent to each other on the tip end 27 of the first shaft 24 of the input shaft 2, on one side of the motor 1 (that is, a side closer to the reduction gear 3 than to the motor 1). The second bearing 8 is arranged closer to the tip end 27b side of the first shaft 24 than is the oil seal 7. Accordingly, the second bearing 8 is arranged on a side slightly closer to the reduction gear 3 than to the center of the output shaft 5.

Even in such a case, since the output shaft 5 is supported by the first bearing 4 and the second bearing 8 at two positions places that are apart from each other, whirling of the output shaft 5 can be suppressed, and the tip end 51 of the output shaft 5 can be guided into the coupling 45 during the maintenance operation.

Although the embodiments of the present invention have been described in detail above, the specific configuration of the present invention is not limited thereto, and any design changes that are within the spirit and scope of the present invention are all included in the present invention.

In the second and third embodiments, an oil seal is provided in the hollow space between the input shaft and the output shaft so that the intrusion of grease as foreign matter into the hollow space is effectively limited. However, instead of the oil seal, a mechanical seal, a labyrinth seal, or the like can be used as long as it can limit the intrusion of grease. Further, when the foreign matter is not grease but water, dirt, or other matter, packing or the like may be used instead of the oil seal in order to suppress the intrusion of such foreign matter.

What is claimed is:

1. A driving apparatus comprising:
   an input shaft with a hollow space formed therein;
   a motor configured to rotate the input shaft about a rotation axis along the axial direction;
   a reduction gear arranged on one side of the motor, the reduction gear being configured to receive power of the motor from the input shaft;
   an output shaft inserted through the hollow space of the input shaft, the output shaft being adapted to rotate about the rotation axis with power output from the reduction gear;
   a coupling connectable to a tip end of the output shaft on the one side of the motor so as to transmit the power output from the reduction gear to the output shaft; and
   a detector provided on another side of the motor, the detector being configured to detect information on rotation of the input shaft and information on rotation of the output shaft,
   wherein:
   a first bearing adapted to support the output shaft is arranged on the other side of the motor,
   a second bearing adapted to support the output shaft is arranged on the one side of the motor in the hollow space between the input shaft and the output shaft, and
   the second bearing is arranged in the hollow space such that the output shaft is integrally and rotatably supported on the input shaft by the second bearing in a state where the output shaft is separated from the coupling.

2. The driving apparatus according to claim 1, wherein the second bearing is arranged on or around a tip end of the input shaft.

3. The driving apparatus according to claim 2, further comprising a seal member arranged closer to the tip end side of the input shaft than is the second bearing, in the hollow space between the input shaft and the output shaft, the seal member being adapted to suppress intrusion of foreign matter into the hollow space.

4. A driving apparatus comprising:
   an input shaft with a hollow space;
   a motor configured to rotate the input shaft;
   an output shaft inserted through the hollow space of the input shaft, the output shaft being adapted to rotate about a rotation axis of the motor;
   a transmitter configured to transmit rotation of the input shaft to the output shaft; and
   a detector configured to detect information on rotation of the input shaft and information on rotation of the output shaft,
   wherein:
   the output shaft has a protrusion on its transmitter side as one side of the output shaft, the protrusion protruding beyond the hollow space, and
   the output shaft has on its detector side a first supporting member adapted to support the output shaft, and has on its transmitter side a second supporting member arranged on or around the protrusion, the second supporting member being adapted to support the output shaft, and
   wherein the second supporting member is arranged in the hollow space such that the output shaft is integrally and rotatably supported on the input shaft by the second supporting member in a state where the output shaft is separated from the coupling.

5. The driving apparatus according to claim 4, wherein:
   the transmitter includes
   a reduction gear arranged on one side of the motor, the reduction gear being configured to receive power of the motor from the input shaft, and
   a coupling connectable to a tip end of the output shaft on the one side of the motor so as to transmit power output from the reduction gear to the output shaft.

6. The driving apparatus according to claim 4, wherein the second supporting member is arranged in the hollow space between the output shaft and the input shaft.

7. The driving apparatus according to claim 5, wherein the second supporting member is arranged around the coupling.

8. The driving apparatus according to claim 1, wherein the second bearing is arranged in the hollow space between the input shaft and the output shaft.

9. The driving apparatus according to claim 1, wherein the output shaft has a protrusion on the one side of the motor, the protrusion protruding beyond the hollow space, and the second bearing is arranged on or around the protrusion.

* * * * *

UNITED STATES PATENT AND TRADEMARK OFFICE
CERTIFICATE OF CORRECTION

PATENT NO. : 11,174,931 B2  
APPLICATION NO. : 16/110900  
DATED : November 16, 2021  
INVENTOR(S) : Nan Jiang et al.

Page 1 of 1

It is certified that error appears in the above-identified patent and that said Letters Patent is hereby corrected as shown below:

On the Title Page

In the (73) Assignee: Please delete "DAIHEN CORPORATION, Tokyo (JP)" and replace with
-- DAIHEN CORPORATION, Osaka, (JP) --

Signed and Sealed this  
Tenth Day of May, 2022

Katherine Kelly Vidal  
*Director of the United States Patent and Trademark Office*